(12) United States Patent
Kawaguchi et al.

(10) Patent No.: US 7,747,361 B2
(45) Date of Patent: Jun. 29, 2010

(54) METHOD OF INJECTING PLURALITY OF SPACECRAFT INTO DIFFERENT ORBITS INDIVIDUALLY

(75) Inventors: Junichiro Kawaguchi, Sagamihara (JP); Yasuhiro Kawakatsu, Sagamihara (JP); Osamu Mori, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 829 days.

(21) Appl. No.: 11/326,440

(22) Filed: Jan. 6, 2006

(65) Prior Publication Data

US 2006/0241824 A1    Oct. 26, 2006

(30) Foreign Application Priority Data

Jan. 6, 2005    (JP)    ............... 2005-001759

(51) Int. Cl.
*G05D 1/00* (2006.01)
*B64G 1/00* (2006.01)
*B64G 1/10* (2006.01)

(52) U.S. Cl. .................. 701/13; 701/3; 244/158.1; 244/158.4; 244/158.5; 244/158.6

(58) Field of Classification Search ............. 701/3, 701/13; 244/158.1, 158.4, 158.5, 158.6
See application file for complete search history.

(56) References Cited

U.S. PATENT DOCUMENTS 4,854,526 A * 8/1989 Rochefort ............... 244/158.1

(Continued)

FOREIGN PATENT DOCUMENTS

JP    07-187091    7/1995

OTHER PUBLICATIONS

A. E. Roy; "On the Use of Interplanetary Probe Orbits of Periods Commensurable with One Year"; Astronaut; Acta; pp. 31-46; vol. IX.*

(Continued)

*Primary Examiner*—Thomas G Black
*Assistant Examiner*—Sze-Hon Kong
(74) *Attorney, Agent, or Firm*—Jacobson Holman PLLC (57) ABSTRACT

In a method for injecting a plurality of spacecraft into different circum-earth or interplanetary orbits individually in a single launch, a plurality of spacecraft coupled to an assist module are injected into an interplanetary orbit having a periodicity synchronous with the earth's revolution period. Then, in a maneuver allowing the assist module to re-counter with and pass near to the earth (Earth swing-by), the assist module appropriately performs an orbital change maneuver and a separation maneuver for each of the spacecraft in a sequential order. Through these maneuvers, a closest-approach point to the earth is changed for each of the spacecraft so as to drastically change a subsequent orbital element for each of the spacecraft. The assist module takes a sufficient time to determine a target orbit for each of the spacecraft with a high degree of accuracy until a half month to several days before a closest-approach time in the Earth swing-by. Based on the determined orbit, the assist module makes an orbit correction of about several m/sec in a sequential order, and then separates the spacecraft therefrom in a sequential order. In this process, an inertia navigation is performed based on an accelerometer mounted in the assist module and information about attitude.

7 Claims, 7 Drawing Sheets

U.S. PATENT DOCUMENTS

| | | | | |
|---|---|---|---|---|
| 5,350,137 | A | * | 9/1994 | Henley .................... 244/158.1 |
| 5,566,909 | A | * | 10/1996 | Lapins .................... 244/173.3 |
| 5,765,784 | A | * | 6/1998 | Lapins .................... 244/173.3 |
| 6,276,639 | B1 | * | 8/2001 | Hornung et al. .......... 244/173.3 |
| 6,729,582 | B2 | * | 5/2004 | Beyer ..................... 244/158.5 |
| 7,219,858 | B2 | * | 5/2007 | Sharer .................... 244/158.4 |
| 7,631,839 | B1 | * | 12/2009 | Duncan et al. ........... 244/158.1 |

OTHER PUBLICATIONS

Johan Schoenmaekers, Rainer Bauske; "Re-design of the Rosetta Mission for Launch in 2004"; ESA/ESOC; Robert-Bosch-Str. 5, D-64293 Darmastadt, Germany.*

Bremen; "Rockot Multiple Orbit Mission Hits Different Orbits"; http://www.spacedaily.com/reports/Rockot_Multiple_Orbit_Mission_Hits_Different_Orbits.html; Jun. 18, 2003.*

Vladimir A. Chobotov; "Orbital Mechanics"; AIAA Education Series; 1996; pp. 278-279, 287-290.

Jhu/Apl; "Mission Design"; http://messenger.jhuapl.edu/the_mission/mission_design.html; 1999-2006.

Kawaguchi, J.: "On the Delta-V Earth Gravity Assist Trajectory (EDVEGA) Scheme with Applications to Solar System Exploration," IAF-01-A.5.02, 2001.

* cited by examiner

FIG.9 ced in cost. Particularly,

METHOD OF INJECTING PLURALITY OF SPACECRAFT INTO DIFFERENT ORBITS INDIVIDUALLY

BACKGROUND OF THE INVENTION

1. Field of the Invention

The present invention relates to a space system including a single assist module coupled to a plurality of space-vehicles or spacecraft, and more particularly to a method of launching the single assist module together with the plurality of spacecraft and then controllably guiding the spacecraft into different desired orbits, such as interplanetary orbits, individually.

2. Description of the Background Art

A problem to be solved by the present invention is a difficulty in, after launching a plurality of spacecraft all together, injection them into different orbits, such as circum-earth orbits or interplanetary orbits, individually. A conventional solution of this problem has involved the need for equipping each of the spacecraft with its own rocket (launch vehicle), and inevitably led to significant increase in cost. Particularly, in an operation for injection a plurality small-size spacecraft into a variety of different orbits individually, it has been essentially required to equip each of the spacecraft with its own launching means. Thus, such an operation has been regarded as unrealizable because of extremely poor efficiency and unacceptable cost performance.

Japanese Patent Laid-Open Publication No. 07-187091 (Patent Publication 1) discloses a method of launching a plurality of space satellites, particularly, a technique of reducing a fuel consumption in an orbit-control propulsion system (orbital maneuvering system) for orbital transfer.

In this technique disclosed in the Patent Publication 1, two satellites S1, S2 mounted on a single common rocket and launched simultaneously are injected into a parking orbit P having a semi-major axis length less than those of first and second target orbits A1, A2. Then, when the parking orbit P comes close to being in plane with the first target orbit A1, an in-plane orbit control is performed using a propulsion system for the first satellite S1 to move the first satellite S1 to the first target orbits A1 via a transfer orbit A1' to the first target orbits A1. Then, in the same manner, when the parking orbit P comes close to being in plane with the second target orbit A2, the second satellite S2 is moved to the second target orbits A2 via a transfer orbit A2' to the second target orbits A2.

Fundamentally, the technique disclosed in the Patent Publication 1 is not designed to change an inclination of a circum-earth orbit. In contrast, the present invention is premised on a system capable of changing an orbital element by means of a perturbation effect arising from a gravitational field of the earth.

In addition to the above problem in principle about incapability of maneuvering an inclination of an established orbit, the technique disclosed in the Patent Publication 1 is not originally designed to inject a plurality of spacecraft into different interplanetary orbits individually.

SUMMARY OF THE INVENTION

In view of the above circumstances, the present invention provides a method for injecting a plurality of spacecraft escaping from a gravitational sphere of the earth, into at least two different orbits in a single launch and then loosing the plurality of spacecraft, respectively, toward different targets. The method comprises the steps of: injecting the plurality of spacecraft into an interplanetary orbit having a periodicity synchronous with the earth's revolution period, in a state of being coupled to a single assist module for assisting a space flight thereof; and performing a swing-by maneuver relative to the earth, wherein, during execution of the swing-by maneuver, the orbit of the assist module is changed in a sequential order with respect to each of the plurality of spacecraft.

In one preferred aspect of the present invention, the step of performing a swing-by maneuver relative to the earth includes changing the orbit of the assist module in a sequential order with respect to each of the plurality of spacecraft a half month to several days before executing the swing-by maneuver, so as to control a closest-approach point to the earth for each of the spacecraft in a conformity to a target orbit for each of the spacecraft, and then separating each of the spacecraft from the assist module in a sequential order.

In another aspect of the present invention, the method includes the step of, when each of the spacecraft after being separated from the assist module in the swing-by step passes through the closest-approach point to the earth, subjecting the spacecraft to an acceleration/deceleration control unique to the spacecraft. In this case, when the spacecraft is subjected to the deceleration control, an established orbit will be an elliptical orbit around the earth.

Preferably, the interplanetary orbit having a periodicity synchronous with the earth's revolution period is one selected from the group consisting of a plurality of singular trajectories or orbits around the sun each of which has a synchronous period including six months, one year, an integer number of years and a period having a rational or irrational number ratio with respect to the earth's revolution period, and a property of being able to re-encounter with the earth regardless of a velocity of escape from the earth.

The term "singular trajectory" means an orbit around the sun which has an irrational period of about 1.4 years, 2.4 years, - - -, and a property of being able to re-encounter with the earth regardless of a velocity of escape from the earth.

In another preferred aspect of the present the step of performing a swing-by maneuver relative to the earth includes, after executing the swing-by maneuver, further repeatedly revolving the assist module around the sun, and executing an additional swing-by maneuver similar to the swing-by maneuver as a backup action for loosing the spacecraft, respectively, toward specific interplanetary orbits.

The step of performing a swing-by maneuver relative to the earth may include a deceleration maneuver for allowing the spacecraft to be captured by the earth's gravitational sphere and injected into at least two different elliptical orbits around the earth.

In this case, the at least two different elliptical orbits may be selected from the group consisting of a combination of at least two elliptical orbits each having a different inclination, a combination of at least two direct and retrograde elliptical orbits, and a combination of at least two polar and low-inclination elliptical orbits.

The swing-by maneuver relative to the earth may be performed by use of the gravity of a planet other than the earth.

The step of injecting the plurality of spacecraft into an interplanetary orbit having a periodicity synchronous with the earth's revolution period may be initiated in a state when the plurality of spacecraft coupled to the assist module makes a flight in a circumterrestrial space or an interplanetary space.

As above, the method of the present invention makes it possible to inject a plurality of spacecraft, i.e., at least two spacecraft or, if needed, dozens of spacecraft, into different interplanetary orbits or different orbits around the earth (circum-earth orbits) individually in a single launch using the single assist module.

When the spacecraft is a planetary exploration spacecraft, the method of the present invention makes it possible to selectively determine a plurality of different directions escaping from the earth, in a single launch, and to loose a plurality of planetary exploration spacecraft toward different astronomical objects individually. Generally, in a launch of a rocket or the like, an escape direction from an orbit of a spacecraft mounted on the rocket or the like is limited to only an in-plane direction of a parking orbit of the rocket or the like. The method of the present invention can completely remove this restriction. In particular, when the planetary exploration spacecraft is a small-size payload, the method of the present invention makes it possible to loose dozens of payloads toward different targets individually. Thus, the method of the present invention can be widely applied to an observation mission of a small celestial body, such as near-earth miniplanet or minicomet.

When the spacecraft is a space satellite, a plurality of launches have been required to inject a plurality of satellites into different orbits, particularly, largely different in inclination. The method of the present invention makes it possible to inject a plurality of satellites into direct and retrograde elliptical orbits, or polar and low-inclination elliptical orbits in a single launch. Thus, the method of the present invention can be expected to have wide applications to a satellite system (constellation) achieving its function using a navigation, communication or global positioning satellite.

DESCRIPTION OF THE PREFERRED EMBODIMENTS

All spacecraft to be injected into different orbits are coupled to an assist base module, and injected into a parking orbit, which is an interplanetary orbit having the shortest periodicity synchronous with the earth's revolution period, in a single launch. The assist base module plays two rolls in correcting an initial orbit-injection error and in finely changing its own orbit during execution of a swing-by maneuver relative to the earth (Earth swing-by) and then separating each of the mounted spacecraft therefrom in a sequential order.

In view of further reliable mission accomplishment, after the Earth swing-by, it is desirable to optionally take a backup action of further repeatedly revolving the assist base module around the sun.

While there is an orbit having a significantly short period, such as 0.5 years, as the shortest synchronous orbit, a synchronous orbit having an encounter period of one year may be practically used, in view of a launch or transport capability of launching means required for an orbit injection of the assist base module.

With reference to the drawings, an embodiment of the present invention will now be specifically described.

Figure 1:
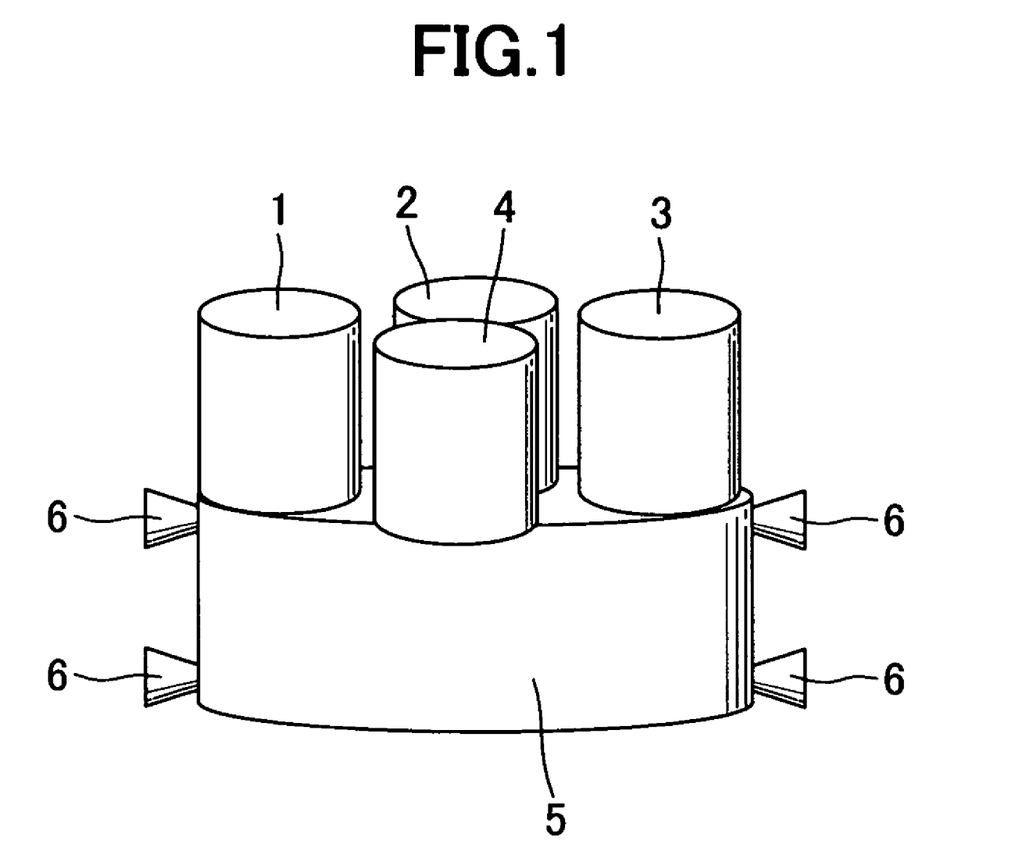
FIG. 1 is a schematic diagram showing an assist module mounting a plurality of spacecraft.

This embodiment is a method for injecting four spacecraft consisting of a first spacecraft 1, a second spacecraft 2, a third spacecraft 3 and a fourth spacecraft 4, into four different target interplanetary orbits in a single launch using a single assist module 5 for the purpose of exploration of four different miniplanets (name: 1999 NA5, 2002 AY1, 2003 YN1 and 2004 MO3). FIG. 1 shows the four spacecraft 1, 2, 3, 4 mounted on the assist module 5. In this embodiment, the four cylindrical-shaped spacecraft are mounted on a circular top surface of the cylindrical-shaped assist module 5 in a concentric arrangement. The assist module 5 is provided with a plurality of attitude-control thrusters 6 at a side surface thereof. The assist module 5 is further provided with a propulsion thruster (not shown) adapted to emit a jet in an axial direction of the spacecraft, at a bottom surface thereof.

The following functions is required, but not limited thereto, for the assist module 5:
 1. Function of orbit control;
 2. Function of communication with ground stations;
 3. Function of attitude control (including function of attitude determination); and
 4. Function of mechanical holding and separation of each spacecraft.

Figure 2:
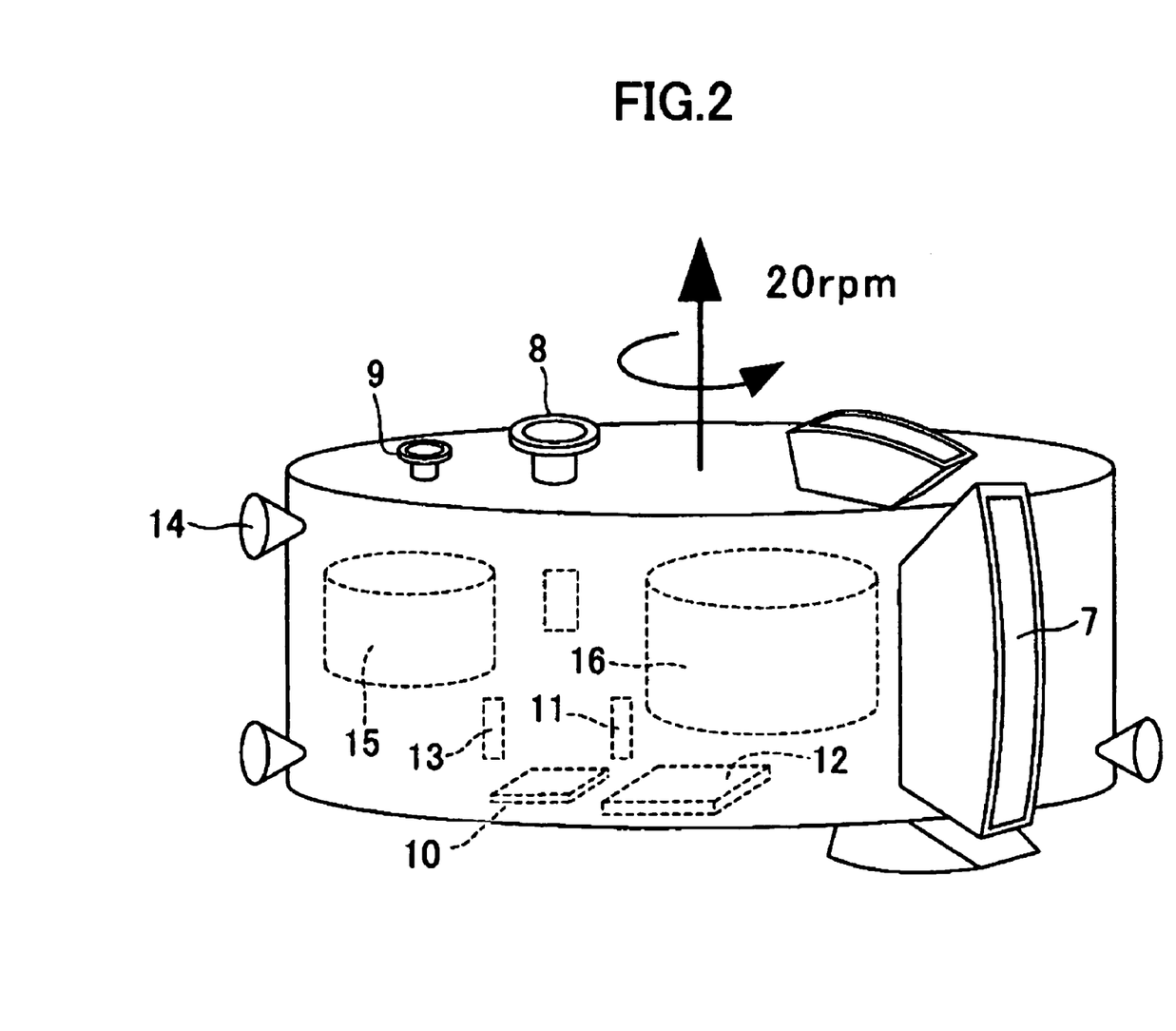
FIG. 2 is a schematic diagram showing one example of the spacecraft.

FIG. 2 schematically shows one example of the spacecraft to be injected into a given target interplanetary orbit in a state of being mounted on the assist module. The spacecraft in this example is provided with a CCD camera 7 for imaging and orbit estimation, a fish-eye lens 8 for imaging, a near-infrared spectroscope 9 for spectrum observation, a 2-dimensional sun sensor 10 for attitude detection, an RF sensor 11 for attitude detection, an ultra-stable oscillator (USO) or transponder 12 for distance measurement, an omnidirectional antenna 13 for communication, a new-type cold gas jet 14 for orbit and attitude control, a data recorder (DR) 15 for data storage and a battery (BAT) 16 for power supply.

Figure 3:
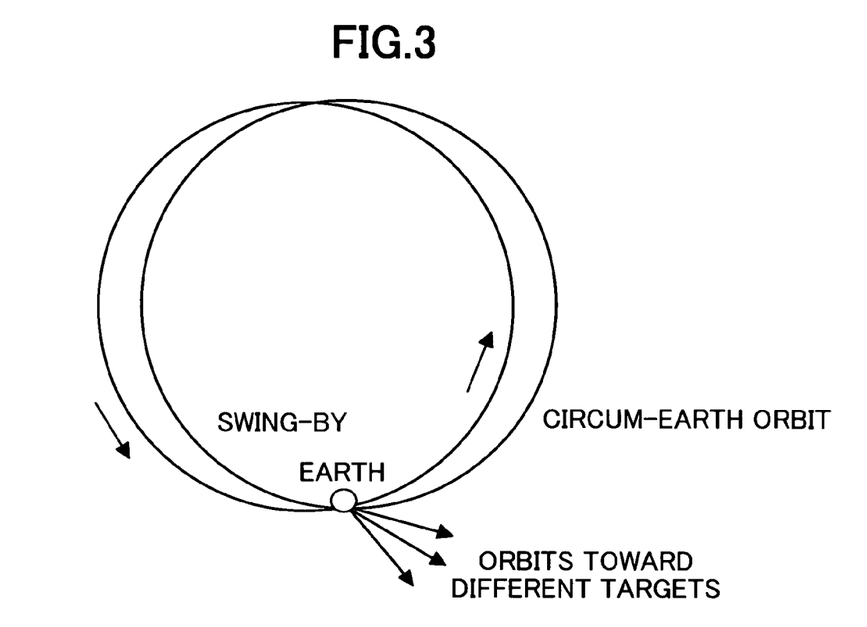
FIG. 3 is a conceptual diagram showing an orbit injection represented using an inertial coordinate-system on the assumption that a synchronous period is one year.
Figure 4:
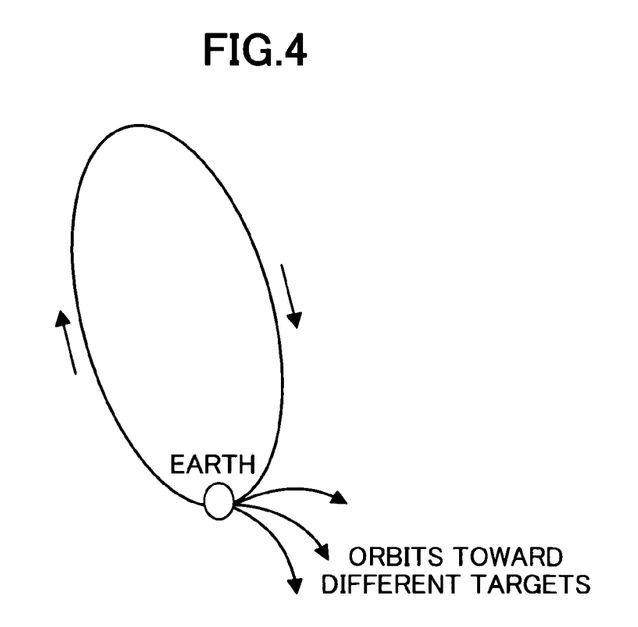
FIG. 4 is a conceptual diagram showing an orbit injection represented using a rotating coordinate system wherein a line between the sun and the earth is fixed.
Figure 5:
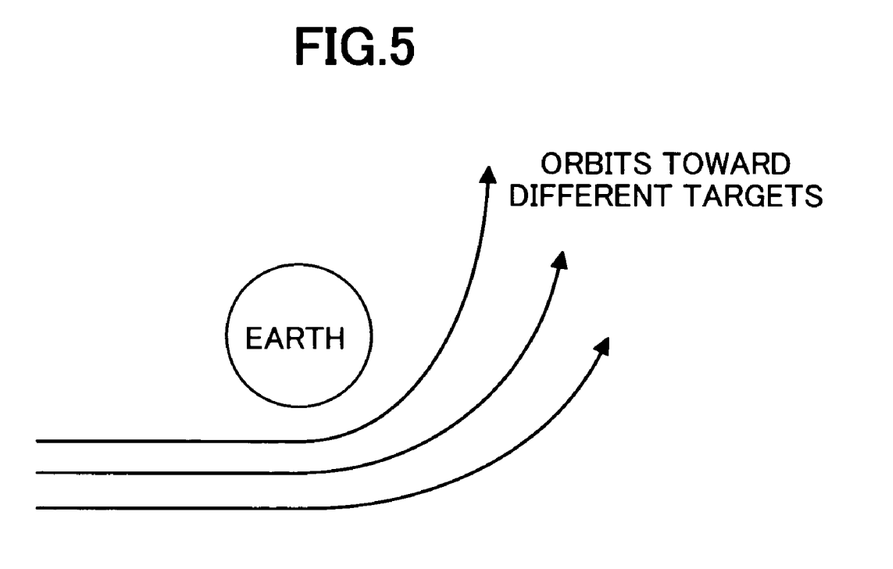
FIG. 5 is a conceptual diagram showing a maneuver in an orbital plane.
Figure 6:
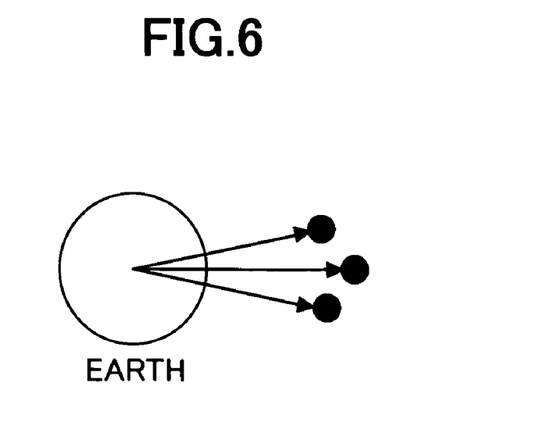
FIG. 6 a conceptual diagram showing a technique of combining a plurality of maneuvers in an out-of-plane direction of an orbit to achieve a plurality of different orbits.

In the method of the present invention, a plurality of spacecraft coupled to a single assist module is injected into an interplanetary orbit having a periodicity synchronous with the earth's revolution period as described above, and then a maneuver for allowing the assist module with the spacecraft to re-encounter with the earth and pass through the vicinity of the earth (hereinafter referred to as "Earth swing-by") is performed. During the Earth swing-by, the assist module appropriately performs an orbital change maneuver and a separation maneuver for each of the spacecraft in a sequential order. Through these maneuvers, a closest-approach point to the earth is changed for each of the spacecraft so as to drastically change a subsequent orbital element for each of the spacecraft. FIG. 3 shows a concept of this orbit injection represented using an inertial coordinate-system. While FIG. 3 shows one example where a synchronous period is one year, various synchronous periods may be selected. FIG. 4 shows this concept represented using a rotating coordinate system wherein a line between the sun and the earth is fixed. FIGS. 5 and 6 show a plurality of orbits during the Earth swing-by.

FIG. 5 shows a maneuver in an orbital plane. FIG. 6 shows one example a plurality of different orbits to be achieved by combining a plurality of maneuvers in an out-of-plane direction of an orbit. The assist module takes a sufficient time to determine a target orbit for each of the spacecraft with a high degree of accuracy until a half month to several days before a closest-approach time in the Earth swing-by. Based on the determined orbit, the assist module makes an orbit correction of about several m/sec in a sequential order, and then separates the spacecraft therefrom in a sequential order. In this process, an inertia navigation is performed based on an accelerometer mounted in the assist module and information about attitude to adequately control an orbital quantity.

While the level of change in escape direction is largely varied depending on an intended purpose of each of the spacecraft, an escape direction can be changed in an angle of one radian by changing the closest-approach point in a distance of about 10,000 km during the Earth swing-by. In this case, the level of the orbit correction to be performed by the assist module is no more than 1 to 10 m/sec although it is varied depending on the timing of implementation thereof. If all directions of a plurality of escape orbits can be assured within several degrees, the orbit correction to be performed by the assist module is about 1 m/sec.

While the orbit correction to be performed by the assist module can include an operational error, the level of the error is about 1 to 2 cm/sec in a practical sense and in an empiric sense, and an orbit correction after the Earth swing-by can be confined to 1 to 10 m/sec. These control quantities are determined with respect to each target interplanetary orbit, and the assist module is controlled based on the determined control quantities at a given timing according to a remote command from the earth.

Figure 7:
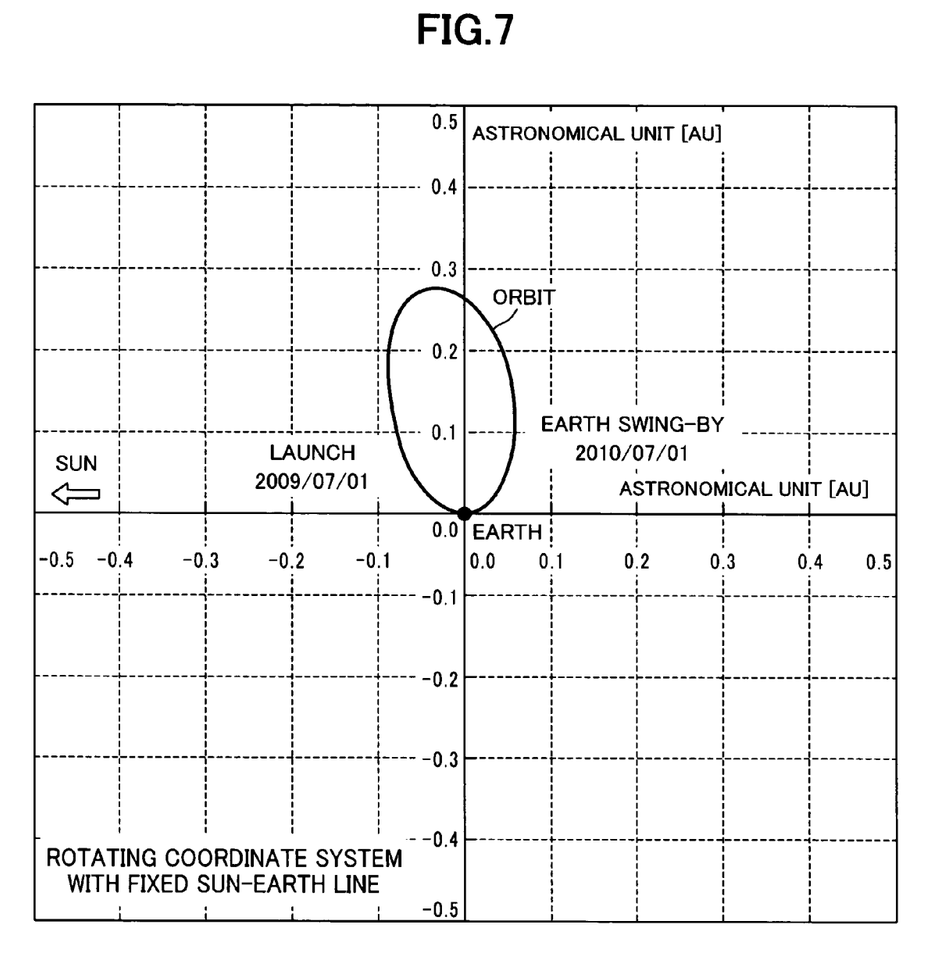
FIG. 7 is a graph showing one example of a synchronous orbit having an encounter period of one year, for use in injecting four spacecraft into four different target interplanetary orbits in a single launch using a single assist module.

FIG. 7 illustrates one example of a synchronous orbit having an encounter period of one year, for use in injecting the four spacecraft 1, 2, 3, 4 into four different target interplanetary orbits in a single launch using the single assist module 5. During the course from a launch to an Earth swing-by in this example, the assist module 5 mounting the four spacecraft 1, 2, 3, 4 is injected into a synchronous orbit to perform the Earth swing-by one year from the launch.

A launch time in this example is Jul. 2, 2009, and launch conditions include an extra-velocity squared C3=9.0 km/s², an escape asymptote declination of −26.0° and an escape asymptote right-ascension of 99.7°. Further, a time of re-encounter with the earth is one year from the launch (Jul. 2, 2010).

Figure 8:
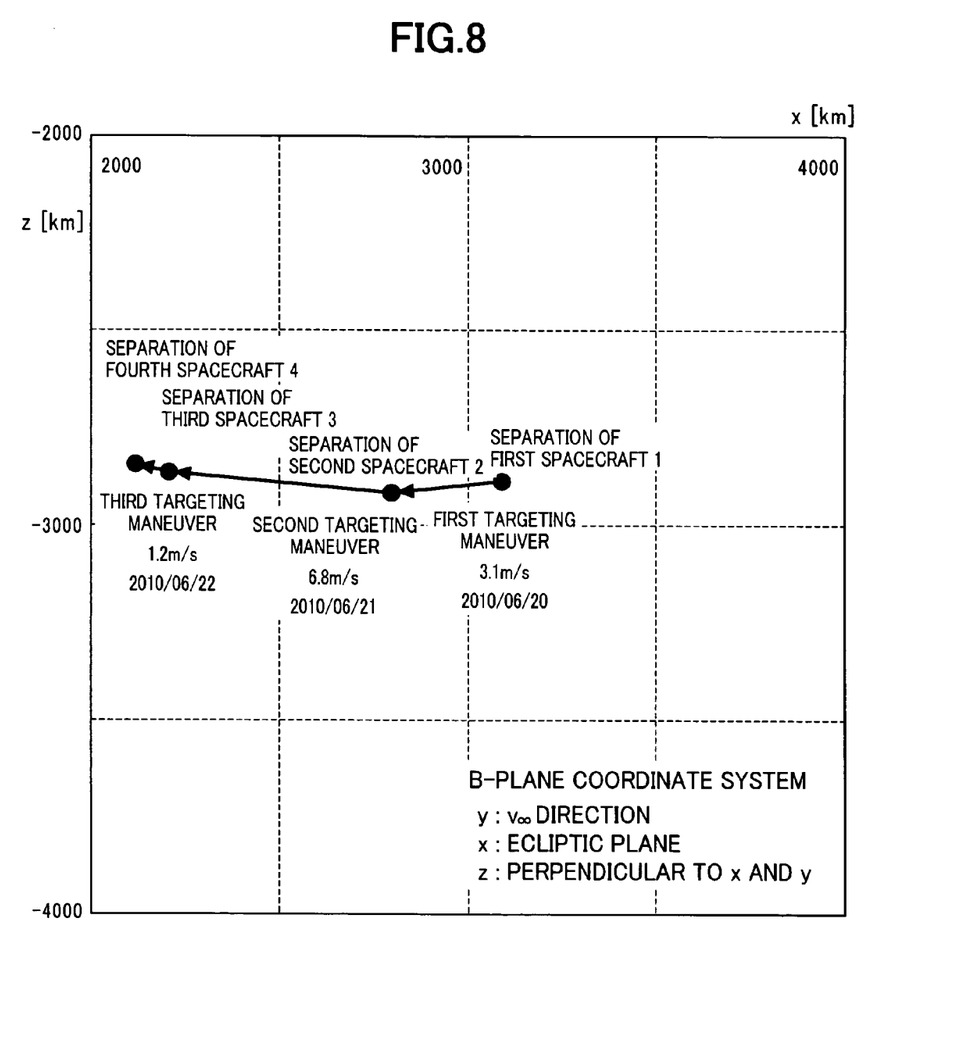
FIG. 8 is a graph showing a time of separating each spacecraft from an assist module and a control quantity of the separation maneuver.

FIG. 8 shows a time of separating each of the spacecraft 1, 2, 3, 4 from the assist module 5 and a control quantity of the separation maneuver. That is, FIG. 8 shows a control quantity and time of a pre-Earth swing-by targeting. The pre-Earth swing-by targeting in this example is performed on a target plane (B-plane), and the four spacecraft 1, 2, 3, 4 are separated at the following times and in the following control quantities:

| | |
|---|---|
| Jun. 19, 2010 | Separation of the first spacecraft 1 |
| Jun. 20, 2010 | First targeting maneuver (3.1 m/s) |
| | Separation of the second spacecraft 2 |
| Jun. 21, 2010 | Second targeting maneuver (6.8 m/s) |
| | Separation of the third spacecraft 3 |
| Jun. 22, 2010 | Third targeting maneuver (1.2 m/s) |
| | Separation of the fourth spacecraft 4 |

Figure 9:
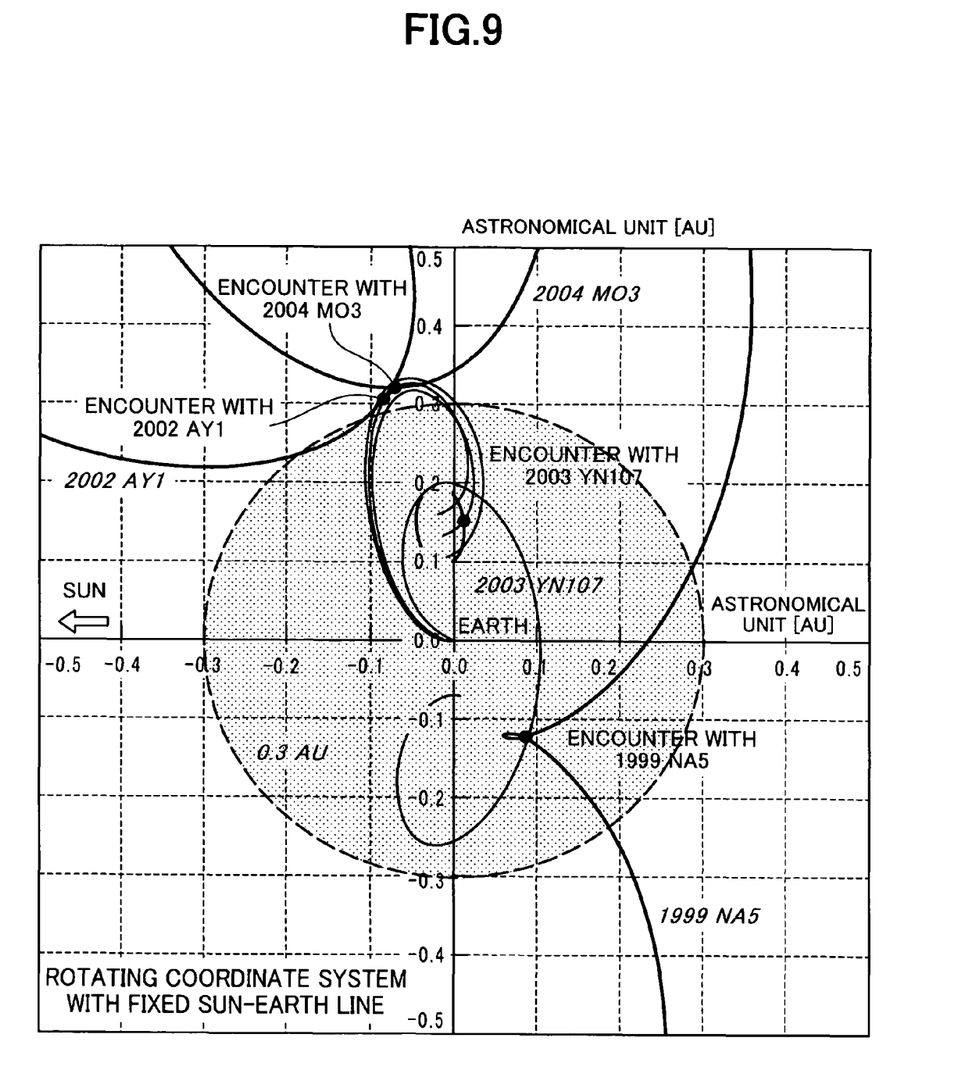
FIG. 9 is a graph showing a state of a target miniplanet-flyby after an Earth swing-by in each spacecraft separated in a process illustrated in FIG. 8.

FIG. 9 shows a state of a target miniplanet-flyby (passing near to each target miniplanet) after the Earth swing-by in each of the spacecraft 1, 2, 3, 4 separated in the above process.

As seen in FIG. 9, the spacecraft 1 to 4 fly, respectively, in different orbits and toward different target miniplanets.

A relationship of target miniplanet-flyby times of the spacecraft and the corresponding target miniplanets is as follows:

| | |
|---|---|
| Jul/01/2010 | Earth swing-by |
| Dec/21/2010 | The second spacecraft 2 |
| | The miniplanet 2002 AY1-flyby |
| Jan/04/2011 | The fourth spacecraft 4 |
| | The miniplanet 2004 MO3-flyby |
| Feb/08/2011 | The third spacecraft 3 |
| | The miniplanet 2003 YN107-flyby |
| Apr/11/2011 | The first spacecraft 1 |
| | The miniplanet 1999 NA5-flyby |

The above control and the conditions of the encounter between each of the spacecraft and each of the target miniplanets are summarized as follows:

| | Spacecraft | | | |
|---|---|---|---|---|
| | first spacecraft | second spacecraft | third spacecraft | fourth spacecraft |
| Miniplanet | 1999 NA5 | 2002 AY1 | 2003 YN107 | 2004 MO3 |
| Flyby Date | Apr/11/2011 | Oct/21/2010 | Feb/08/2011 | Jan/04/2011 |
| Relative Velocity between Spacecraft and Miniplanet | 4.7 km/s | 18.3 km/s | 1.7 km/s | 11.1 km/s |
| Relative Velocity/ Sun Angle | 59.7° | 48.2° | 18.7° | 11.9° |
| Distance from Earth | 0.15 AU | 0.33 AU | 0.32 AU | 0.33 AU |
| Absolute Magnitude | 20.3 | 20.6 | 26.2 | 21.2 |

The relative velocity/sun angle is an angle between a sun direction and a vector direction viewed from each of the spacecraft.

INDUSTRIAL APPLICABILITY

The international acquisition of a patent right on this invention will bring about positive effects in achievement of international cooperation-based missions. The interplanetary-orbit injection method of the present invention is strongly desired by planetary science laboratories in many countries. The present invention would contribute to space science, particularly, planetary science research.

What is claimed is:

1. A method for injecting a plurality of spacecraft escaping from a gravitational sphere of the earth, into at least two different interplanetary orbits in a single launch and then loosing said plurality of spacecraft toward respective, different targets, comprising the steps of:

injecting said plurality of spacecraft into an interplanetary orbit in a state of being coupled to a single assist module for assisting a space flight thereof, wherein said interplanetary orbit has a periodicity of six months, one year, or an integer number of years synchronous with the earth's revolution period or has a period having a rational or irrational number ratio with respect to the earth's revolution period;

making a thrust-powered initial orbital correction to the assist module of about several m/sec in a sequential order with respect to each of said plurality of spacecraft, to control the closest-approach point relative to the earth for each of the spacecraft in conformity to a target orbit for each of the spacecraft, to drastically change a subsequent escape path for each of the spacecraft during said initial orbital correction, beginning a half month to several days before the closest-approach; and after making said orbital correction, loosing each of said spacecraft from said assist module in a sequential order toward respective, different targets.

2. The method as defined in claim 1, which includes the further step of, when each of the spacecraft after being separated from said assist module in said loosing step passes through said closest-approach point to the earth, subjecting said spacecraft to an acceleration/deceleration control unique to said spacecraft.

3. The method as defined in claim 1, further including the step of, after making said initial orbital correction, further repeatedly revolving said assist module around the sun, and making an additional orbital correction similar to said initial orbital correction as a backup action for loosing said spacecraft, respectively, toward specific interplanetary orbits.

4. The method as defined in claim 1, wherein said step of making an initial orbital correction relative to the earth includes a deceleration maneuver for allowing said spacecraft to be captured by the earth's gravitational sphere and injected into at least two different elliptical orbits around the earth.

5. The method as defined in claim 1, wherein said step of making an initial orbital correction relative to the earth is performed by use of the gravity of a planet other than the earth.

6. The method as defined in claim 1, wherein said step of injecting said plurality of spacecraft into an interplanetary orbit is initiated in a state when said plurality of spacecraft coupled to said assist module makes a flight in a circumterrestrial space or an interplanetary space.

7. The method as defined in claim 4, wherein said at least two different elliptical orbits are selected from the group consisting of a combination of at least two elliptical orbits each having a different inclination, a combination of at least two direct and retrograde elliptical orbits, and a combination of at least two polar and low-inclination elliptical orbits.

* * * * *